(12) United States Patent
Larsen et al.

(10) Patent No.: US 8,163,436 B2
(45) Date of Patent: Apr. 24, 2012

(54) SOLID OXIDE FUEL CELL STACK HAVING A GLASS SEALANT COMPOSITION

(75) Inventors: Jørgen Gutzon Larsen, Bagsværd (DK); Christian Olsen, Ballerup (DK); Marie Drejer Jensen, Smørum (DK)

(73) Assignee: Topsoe Fuel Cell A/S, Lyngby (DK)

( * ) Notice: Subject to any disclaimer, the term of this patent is extended or adjusted under 35 U.S.C. 154(b) by 498 days.

(21) Appl. No.: 12/413,213

(22) Filed: Mar. 27, 2009

(65) Prior Publication Data
US 2009/0253017 A1  Oct. 8, 2009

(30) Foreign Application Priority Data

Apr. 7, 2008  (DK) .................................. 2008 00508

(51) Int. Cl.
*H01M 8/10* (2006.01)
(52) U.S. Cl. ......... 429/469; 429/495; 429/508; 429/509
(58) Field of Classification Search .................. 429/468, 429/469, 495, 508, 509
See application file for complete search history.

(56) References Cited

U.S. PATENT DOCUMENTS

| | | | |
|---|---|---|---|
| 5,232,797 A * | 8/1993 | Moulton et al. | ............. 429/210 |
| 2003/0203267 A1 | 10/2003 | Chou et al. | |
| 2005/0147866 A1 | 7/2005 | Ko et al. | |
| 2006/0172141 A1 | 8/2006 | Huang et al. | |
| 2009/0004544 A1 | 1/2009 | Mukerjee et al. | |

FOREIGN PATENT DOCUMENTS

| | | |
|---|---|---|
| EP | 1 010 675 A1 | 6/2000 |
| EP | 1 200 371 B1 | 5/2002 |
| EP | 1 950 826 A1 | 7/2008 |
| EP | 1 975 947 A1 | 10/2008 |
| EP | 2 109 173 A2 | 10/2009 |
| JP | 2003-197215 A | 7/2003 |
| WO | WO 2008/026802 A1 | 3/2008 |
| WO | WO 2008/060336 A2 | 5/2008 |
| WO | WO 2009/139832 A1 | 11/2009 |

OTHER PUBLICATIONS

Zheng et al. "SiO2-CaO-B2O3-Al2O3 ceramic glaze as sealant for planar ITSOFC", J. of Power Sources 128 (2004) 165-172.*
S. Taniguchi et al., "Improvement of Thermal Cycle Characteristics of a Planar-Type Solid Oxide Fuel Cell by Using Ceramic Fiber As Sealing Material." *Journal of Power Sources*. vol. 90, 2000, pp. 163-169.

* cited by examiner

*Primary Examiner* — Gregg Cantelmo
(74) *Attorney, Agent, or Firm* — Dickstein Shapiro LLP

(57) ABSTRACT

Solid oxide fuel cell stack obtainable by a process comprising the use of a glass sealant with composition 50-70 wt % $SiO_2$, 0-20 wt % $Al_2O_3$, 10-50 wt % CaO, 0-10 wt % MgO, 0-2 wt % ($Na_2O+K_2O$), 5-10 wt % $B_2O_3$, and 0-5 wt % of functional elements selected from $TiO_2$, $ZrO_2$, F, $P_2O_5$, $MoO_3$, $Fe_2O_3$, $MnO_2$, La—Sr—Mn—O perovskite (LSM) and combinations thereof.

10 Claims, 2 Drawing Sheets

SOLID OXIDE FUEL CELL STACK HAVING A GLASS SEALANT COMPOSITION

FIELD OF THE INVENTION

The present invention concerns a process for preparing a Solid Oxide Fuel Cell (SOFC) stack in which the fuel cell units and interconnect plates making up the stack are provided with a glass sealant having a TEC significantly lower than the rest of the fuel cell prior to operation. The gas sealant is provided as a thin sheet of paste or glass fibers having a composition within the system comprising $CaO$—$MgO$—$SiO_2$—$Al_2O_3$—$B_2O_3$. More specifically, the invention concerns a solid oxide fuel cell stack obtainable by a process comprising the use of a glass sealant with composition 50-70 wt % $SiO_2$, 0-20 wt % $Al_2O_3$, 10-50 wt % CaO, 0-10 wt % MgO, 0-2 wt % ($Na_2O + K_2O$), 5-10 wt % $B_2O_3$, and 0-5 wt % of functional elements selected from $TiO_2$, $ZrO_2$, F, $P_2O_5$, $MoO_3$, $Fe_2O_3$, $MnO_2$, La—Sr—Mn—O perovskite(LSM) and combinations thereof. The glass sealant is preferably a thin sheet of glass fibers in the form of E-glass.

BACKGROUND OF THE INVENTION

A SOFC comprises an oxygen-ion conducting electrolyte, a cathode where oxygen is reduced and an anode where hydrogen is oxidised. The overall reaction in a SOFC is that hydrogen and oxygen electrochemically react to produce electricity, heat and water. The operating temperature for a SOFC is in the range 600 to 1000° C., often 650 to 1000° C., more often 750 to 850° C. A SOFC delivers in normal operation a voltage of normally below about 0.75V. The fuel cells are therefore assembled in stacks in which the fuel cells are electrically connected via interconnector plates.

Typically, such fuel cells are composed of Y-stabilized zirconia (YSZ) electrolyte together with cathode and anode electrodes and contact layers to the electron conducting interconnect plate. The interconnect makes the series connection between the cells and is normally provided with gas supply channels for the fuel cell. Gas-tight sealants are also usually provided to avoid the mixing of air from the cathode region and fuel from the anode region and they provide also for the proper bonding of the fuel cell units with the interconnector plates. The sealants are thus vitally important for the performance, durability and safe operation of the fuel cell stacks.

During operation the SOFC is subjected to thermal cycling and may thereby be exposed to tensile stress. If the tensile stress exceeds the tensile strength of the fuel cell, it will crack and the whole fuel cell stack will malfunction. One source of tensile stress in the SOFC arises from the discrepancies between the thermal expansion coefficients (TEC) of the cell stack components. The high operating temperature and thermal cycling of a SOFC stack require that the interconnect plates are made of materials which have a TEC similar to that of the fuel cell units. It is today possible to find suitable materials for interconnect plates which have substantially the same TEC as the cells.

Another source of tensile stress which is more difficult to avoid results from the discrepancy in TEC of the sealant, often a glass sealant, with respect to the interconnect plates and the cells in the fuel cell stack. It is normally recognized that the thermal expansion coefficient (TEC) of the sealant should be in the range $11$-$13 \cdot 10^{-6} K^{-1}$ (25-900° C.), thus corresponding to the TEC of the interconnector plate and/or the fuel cell in order eliminate cracks formation in the fuel cell components. Furthermore, the sealing material has to be stable over a time span of say 40,000 h without reacting with the other materials and/or ambient gasses.

A common material used in gas-tight sealants is glass of varying compositions and much work has been concentrated on development of suitable glass compositions:

Our EP-A-1,010,675 describes a number of glass sealing materials suitable for SOFC, including alkaline oxide silicate glasses, mica glass ceramics, alkaline-earth oxide borosilicate/silicaborate glasses and alkaline-earth alumina silicates. This citation teaches the preparation of a glass sealing material based on dried glass powder and a filler material. The TEC of the glass powder may be as low as $7.5 \cdot 10^{-6} K^{-1}$ and accordingly, filler material is added to increase the TEC in the final glass powder so that it substantially matches that of the interconnector plates and fuel cell units having TEC of $9$-$13 \cdot 10^{-6} K^{-1}$.

EP-A-1,200,371 describes a glass-ceramic composition which is provided as a blend of $Al_2O_3$, BaO, CaO, SrO, $B_2O_3$ and $SiO_2$ within specific ranges. The glass and crystallized (after heat treatment) glass-ceramic show TEC ranging from $7 \cdot 10^{-6} K^{-1}$ to $13 \cdot 10^{-6} K^{-1}$. However, a considerable amount of BaO is required in the glass ceramic composition to obtain the high TEC. Prior to heat treatment, the TEC of the glass-ceramic substantially matches that of the other solid ceramic components (within 30%).

S. Taniguchi et al. Journal of Power Sources 90 (2000) 163-169 describes the use of a silica/alumina (52 wt % SiO2, 48 wt % $Al_2O_3$; FIBERFRAX® FFX paper #300, Toshiba Monofrax, thickness 0.35 mm) ceramic fiber as sealing material in solid oxide fuel cells. This sealant is able to suppress electrolyte-cracks in the fuel cell but the sealant properties are insufficient, as gas leakage is detected near the sealing material.

US-A-2003/0203267 discloses the use of multilayer seals including the use of a glass material containing 58% $SiO_2$, about 9% B2O3, about 11% $Na_2O$, about 6% $Al_2O_3$, about 4% BaO, and ZnO, CaO and $K_2O$.

It is an object of the present invention to provide a solid oxide fuel cell stack containing a gas-tight sealant which does not initiate cracking in the cells and which has low reactivity with other cell stack components.

It is another object of the invention to provide a solid oxide fuel cell stack containing a gas-tight sealant which enables faster production of the stacks with better thickness tolerance of the sealant across the stack.

It is yet another object of the invention to provide a solid oxide fuel cell stack containing a gas-tight sealant which enables low electrical conductivity at the operation temperature of the stack.

These and other objects are solved by the invention.

DETAILED DESCRIPTION OF THE INVENTION

Accordingly, we provide a solid oxide fuel cell stack obtainable by a process comprising the steps of:

(a) forming a first fuel cell stack assembly by alternating at least one interconnector plate with at least one fuel cell unit, in which each fuel cell unit comprises an anode, a cathode and an electrolyte arranged between the anode and cathode, and providing a glass sealant in between the interconnector plate and each fuel cell unit, in which the glass sealant has the composition:

50-70 wt % $SiO_2$, 0-20 wt % $Al_2O_3$, 10-50 wt % CaO, 0-10 wt % MgO, 0-2 wt % ($Na_2O+K_2O$), 5-10 wt % $B_2O_3$, and 0-5 wt % of functional elements selected from $TiO_2$, $ZrO_2$, F, $P_2O_5$, $MoO_3$, $Fe_2O_3$, $MnO_2$, La—Sr—Mn—O perovskite (LSM) and combinations thereof;
(b) converting said first fuel cell stack assembly into a second assembly having a glass sealant of thickness 5-100 µm by heating said first assembly to a temperature of 500° C. or higher and subjecting the cell stack to a load pressure of 2 to 20 kg/cm²;
(c) converting said second assembly into a final fuel cell stack assembly by cooling the second assembly of step (b) to a temperature below that of step (b).

Preferably in step (b) the temperature is 800° C. or higher and the load pressure is 2 to 10 kg/cm². Hence, in a preferred embodiment we provide a solid oxide fuel cell stack obtainable by a process comprising the steps of:
(a) forming a first fuel cell stack assembly by alternating at least one interconnector plate with at least one fuel cell unit, in which each fuel cell unit comprises an anode, a cathode and an electrolyte arranged between the anode and cathode, and providing a glass sealant in between the interconnector plate and each fuel cell unit, in which the glass sealant has the composition:
50-70 wt % $SiO_2$, 0-20 wt % $Al_2O_3$, 10-50 wt % CaO, 0-10 wt % MgO, 0-2 wt % ($Na_2O+K_2O$), 5-10 wt % $B_2O_3$, and 0-5 wt %6 of functional elements selected from $TiO_2$, $ZrO_2$, F, $P_2O_5$, $MoO_3$, $Fe_2O_3$, $MnO_2$, La—Sr—Mn—O perovskite (LSM) and combinations thereof;
(b) converting said first fuel cell stack assembly into a second assembly having a glass sealant of thickness 5-100 µm by heating said first assembly to a temperature of 800° C. or higher and subjecting the cell stack to a load pressure of 2 to 10 kg/cm²;
(c) converting said second assembly into a final fuel cell stack assembly by cooling the second assembly of step (b) to a temperature below that of step (b).

In this specification the terms "glass sealant" and "gas-tight sealant" are used interchangeably.

The stack of step (c) may for instance be cooled to room temperature. By room temperature (RT) is meant the ambient temperature at which the first fuel cell stack assembly is prepared, normally 20-30° C.

By heating said first fuel cell stack assembly to a temperature of 800° C. or higher, such as 850° C., 900° C., 950° C. or higher and at the same time pressing the cell stack with a load pressure (tightening pressure) of 2-10 kg/cm², preferably 4-8 kg/cm², it is possible to squeeze the sealant material so as to form a tight and dense sealant. Still, the load pressure may be higher than 10 kg/cm², for instance up to 20 kg/cm², such as 14 or 18 kg/cm². Preferably, the temperature in step (b) is in the range 800-900° C. Yet, instead of heating to 800° C. or higher, lower temperatures may be used, such as temperatures in the range 500-800° C., such as 550, 600, 650, 700 or 750° C. The closed porous structure thus obtained renders the sealant less susceptible to leakage. The resulting thickness of the sealant is in the range 5 to 100 µm, often 5 to 50 µm, more often 10 to 35 µm.

In another preferred embodiment the glass sealant has the composition:
50-65 wt % $SiO_2$, 0-20 wt % $Al_2O_3$, 15-40 wt % CaO, 0-10 wt % MgO, 0-2 wt % ($Na_2O+K_2O$), 5-10 wt % $B_2O_3$, and 0-5 wt % of functional elements selected from $TiO_2$, $ZrO_2$, F, $P_2O_5$, $MoO_3$, $Fe_2O_3$, $MnO_2$, La—Sr—Mn—O perovskite (LSM) and combinations thereof.

It would be understood that the glass sealant composition may be free of $Al_2O_3$ (0 wt %), but preferably it contains up to 20 wt % $Al_2O_3$, such as 10-15 wt % $Al_2O_3$. Likewise the glass sealant composition may be free of MgO (0 wt %), but preferably it contains up to 10 wt % MgO, such as 0.5-4 wt % MgO. The glass sealant composition may be free (0 wt %) of $Na_2O+K_2O$, but preferably it contains up to 2 wt % $Na_2O+K_2O$. The glass composition may also be free (0 wt %) of functional elements selected from $TiO_2$, $ZrO_2$, F, $P_2O_5$, $MoO_3$, $Fe_2O_3$, $MnO_2$, La—Sr—Mn—O perovskite (LSM) and combinations thereof, but it may contain up to 5 wt % of these.

Preferably, the content of $SiO_2$, $Al_2O_3$, CaO and MgO represents 85-95 wt % or 87-97 wt % of the glass sealant composition, while the content of $Na_2O+K_2O$ and $B_2O_3$ represents 5-12 wt % of the glass sealant composition, and functional elements selected from $TiO_2$, F, $ZrO_2$, $P_2O_5$, $MoO_3$, $Fe_2O_3$, $MnO_2$ and La—Sr—Mn—O perovskite (LSM) and combinations thereof represent 0-5 wt %.

As such, the invention encompasses the use of glass with composition 50-70 wt % $SiO_2$, 0-20 wt % $Al_2O_3$, 10-50 wt % CaO, 0-10 wt MgO, 0-2 wt % ($Na_2O+K_2O$), 5-10 wt % $B_2O_3$, and 0-5 wt % of functional elements selected from $TiO_2$, $ZrO_2$, F, $P_2O_5$, $MoO_3$, $Fe_2O_3$, $MnO_2$, La—Sr—Mn—O perovskite (LSM) and combinations thereof, as glass sealant in solid oxide fuel cell stacks.

In a particular embodiment of the invention the glass sealant is a glass with composition: 52-56 wt % $SiO_2$, 12-16 wt % $Al_2O_3$, 16-25 wt % CaO, 0-6 wt % MgO, 0-2 wt % $Na_2O+K_2O$, 5-10 wt % $B_2O_3$, 0-1.5 wt % $TiO_2$, 0-1 wt % F. This glass composition corresponds to the composition of E-glass and shows a thermal expansion coefficient of about $5.4 \cdot 10^{-6}$ $K^{-1}$ from −30 to 250° C. The TEC of interconnector plates is normally $12\text{-}13 \cdot 10^{-6} K^{-1}$ and for interconnector plates made of Inconnel 600 containing 18 wt % Cr, 8 t % Fe with Ni as balance, the TEC may be as high as $17 \cdot 10^{-6}$ $K^{-1}$. As such, the invention encompasses therefore also the use of E-glass with composition 52-56 wt % $SiO_2$, 12-16 wt % $Al_2O_3$, 16-25 wt % CaO, 0-6 wt % MgO, 0-2 wt % $Na_2O+K_2O$, 5-10 wt % $B_2O_3$, 0-1.5 wt % $TiO_2$, 0-1 wt % F as glass sealant in solid oxide fuel cell stacks.

A preferred E-glass composition is 55.11 wt % $SiO_2$, 15.85 wt % CaO, 4.20 wt % MgO, 15.34 wt % $Al_2O_3$, 8.80 wt % $B_2O_3$, 0.39 wt % $Na_2O$, and 0.31 wt % $K_2O$. Another suitable E-glass composition is 55.50 wt % $SiO_2$, 19.80 wt % CaO, 1.80 wt % MgO, 14.00 wt % $Al_2O_3$, 8.00 wt % $B_2O_3$, 0.90 wt % $Na_2O$.

We have found that despite the significantly lower TEC of the sealing material in the first fuel cell stack assembly of step (a), it is possible to prepare a final fuel cell stack in which the TEC of the components including the sealant work well together without creation of leakages during normal operation and thermal cycling. It appears that the sealant is kept under compression during the cooling step (c) due to the larger contraction in the interconnector plate and the cell during this stage. A calculation based on an elastic fracture mechanical model which takes into consideration the non-linearity of the thermal expansion coefficient using a TEC of $13.3 \cdot 10^{-6} K^{-1}$ (RT-700° C.) for the interconnect plates and the cells, and $6 \cdot 10^{-6}$ $K^{-1}$ for a glass sealant according to the invention with thickness 11-33 µm and forming 10% of the stack shows that the maximum energy release rate for the glass layers is 20 J/m², which is close to the maximum release rate of the cell (18 J/m²). Hence, no cracking of the cells takes place due to the formation of the very thin glass sealant, i.e. 5-100 µm and in this particular case 11-33 µm.

In the heating step (b) the first fuel cell stack assembly is more preferably heated to 850-900° C. and maintained at this temperature for hold times of 2 to 6 hours. At these hold times and even after about 10 hours no significant crystallization of the sealant occurs. However, after prolonged heating, for instance after about 84 hr at 850° C., crystallization takes place and the TEC of the sealant surprisingly increases up to $10 \cdot 10^{-6}$ K$^{-1}$ as measured in the range 25-800° C.

The glass sealant may or may not crystallize during the heating step (b) depending on the temperature and hold time used. Crystallization is inevitable during operation over more than 100 h at any temperature equal or above 800° C. For instance, after 168 h of heat treatment at 800° C. crystallization of the sealant takes place in a composition similar to that obtained at 850° C. for a hold time of 84 hours, resulting in a TEC up to $10 \cdot 10^{-6}$ K$^{-1}$ as measured in the range 25-800° C. The crystallizing phases of the sealant, particularly when using a sealant having E-glass composition as recited above, is diopside ranging in composition from diopside to wollastonite, anorthite and cristobalite, while the $B_2O_3$ may stay in the glass phase. When MgO is present in the glass diopside $(CaMg)Si_2O_6$ may crystallize as the first phase. The pseudowollastonite/wollastonite $(CaSiO_3)$ crystallizes around the diopside core. Anorthite $CaAl_2Si_2O_8$ form a solid solution series with albite, $NaAlSi_3O_8$, when $Na_2O$ is present in the melt. A limited amount of $K_2O$ may also be included. The unexpectedly high TEC in the crystallized sealant appears to be the result of the formation of the diopside-wollastonite (TEC about $8 \cdot 10^{-6}$ K$^{-1}$) and cristobalite (TEC about $20 \cdot 10^{-6}$ K$^{-1}$), which counteract the presence of the low TEC anorthite (TEC about $5 \cdot 10^{-6}$ K$^{-1}$).

The crystallized sealant imposes less tensile force onto the ceramic cell and thus reduces the risk of crack formation.

Accordingly, the sealant has a better match with the rest of the fuel cell, particularly the interconnect, and the risk for fuel cell cracking during thermal cycling is further suppressed.

In order to ensure a fast crystallization of the sealant, nucleation elements such as Pt, F, $TiO_2$, $ZrO_2$, $MoO_3$, LSM and $Fe_2O_3$ can be added.

The sealant is poor in alkali components given by the sum $Na_2O+K_2O$, and is free of BaO. Normally a low (<2 wt %) alkali content of the sealant ensures a low electrical conductivity. Furthermore, alkali elements in significant amounts are corrosive to the Cr-rich oxide scale of interconnects made of chromium based alloys by forming $Na_2CrO_4$ having a melting point of 792° C., $K_2CrO_4$ having a melting point of 976° C., or $(Na,K)_2CrO_4$ with a minimum melting point of 752° C. These components become mobile at 800° C. and electrically conductive when operating at this temperature. The alkaline earth BaO used in the prior art to increase the TEC may also be corrosive to the Cr-oxide scale forming $BaCrO_4$ which may generate detachment cracks.

In another embodiment of the invention the glass sealant in step (a) is provided as a sheet of glass fibres.

As used herein the term "sheet of glass fibres" defines a layer 0.10 to 1.0 mm thick of glass fibres applied in step (a) and which corresponds to a 5 to 100 μm thick dense sealant layer after treatment according to the invention. The sheet of glass fibres is preferably fibre glass paper, more preferably E-glass paper such as fibre glass paper containing or loaded with fibres in an amount ranging from 20 to 200 g/m², preferably 30 to 100 g/m², such as 50 to 100 g/m²

Preferably, the sheet of glass fibres contains fibres in an amount of 100 to 200 g/m² towards the cell unit and 20 to 50 or 60 g/m² towards the interconnect plate. More preferably, the sheet of glass fibres contains fibres in an amount of 70-100 g/m², such as 100 g/m² towards the cell and 30-60 g/m², such as 50 g/m² towards the interconnect plate corresponding to about 40 and 20 μm thick dense sealant layer after treatment according to the invention. Most preferably, the sheet of glass fibres is E-glass paper and contains fibres in an amount of 70-100 g/m², such as 100 g/m² towards the cell and 30-60 g/m², such as 50 g/m² towards the interconnect plate corresponding to about 40 and 20 μm thick dense sealant layer after treatment according to the invention. More specifically, using for instance 80 g/m² towards the cell results in a sealant thickness of about 30 μm and 30 g/m² towards the interconnect results in a thickness of about 10 μm. By providing different thicknesses of the sheet of glass fibres towards the cell and towards the interconnect plate, a superior sealing of the resulting SOFC stack is achieved.

The provision of the sealant as a sheet of glass fibres, for instance as a gasket of glass fibres, such as E-glass fibres, results in improved thickness tolerance compared to fuel cell stacks in which the sealant is provided as powder. The thickness of the sealant in the final fuel cell stack of 5-100 μm, preferably 5-50 μm, is kept within a specified narrow range such as ±5 μm. Thus, disparities in the thickness of the sealant between the fuel cell units of the final fuel cell stack are eliminated or at least significantly reduced compared to fuel cell stacks in which the sealant is provided by conventional spraying or deposition of a slurry or paste pre-pared from e.g. powder. Further, the provision of the sealant in step (a) as a sheet of glass fibres enables that the solid oxide fuel cell stack comprising the sealant can be made by simple punching commercial available E-glass fibre bands without resorting to much more expensive alternatives such as the implementation of processing steps connected with the production of glass powder into a slurry or a paste to form the sealant or the addition of filler material to increase the TEC of the sealant.

The sheet of glass fibres may be provided as chopped E-glass fibres such as commercial E-glass in the form of sheets of 0.10-1.0 mm, preferably 0.3-1.0 mm in thickness, corresponding to a thickness of the sealant in the final fuel cell stack of 5-50 μm, often 10-40 μm, more often 10-35 μm, such as 20 μm and particularly 11-33 μm. The sheet of E-glass fibres is commercially available (e.g. E-glass of 50-100 g/m²) and represents a simple and inexpensive solution to the problem of providing proper sealants in fuel cell stacks, i.e. sealants which during operation suppress fuel cell cracking, which are gas-tight, which provide electrical isolation of the cell and which present low reactivity with interconnector plates. When using E-glass as the starting glass material, this E-glass is also preferably provided as a sheet of glass fibres, such as E-glass fibre paper. Because E-glass may be delivered as rolls of glass fibres, the shape of the sealant with corresponding holes for the separate passage of fuel or oxidant can be provided efficiently and expediently by simple punching methods.

In yet another embodiment the sealant in step (a) is loaded with filler material in the form of MgO, steel-powder, quartz, leucite and combinations thereof. The high TEC of the filler material enables to obtain a composite glass sealant with a TEC corresponding to that of the interconnect plate i.e. $12\text{-}13 \cdot 10^{-6}$ K$^{-1}$.

In another embodiment the glass sealant is a paste formed by mixing a glass powder having the composition recited in claim 1 with a binder and an organic solvent. The paste is used for screen printing or as a paste to be used in a dispenser to make a sealant.

The glass powder may be mixed with a filler in the form of MgO, steel-powder, quartz, leucite and combinations thereof in order to produce a glass having TEC of $12\text{-}13 \cdot 10^{-6}$ K$^{-1}$.

Once again and regardless of whether the glass is provided as a sheet of glass fibres or as a paste, by the invention it is possible to convert the starting glass fibre material into a thin glass sealant, i.e. 5-100 μm, often 5-50 μm, preferably 11-33 μm, in the final fuel cell stack which is dense and thereby gas-tight, i.e. hermetic. This is highly desirable since a hermetic sealant serves to prevent the mixing of the fuel in the anode and the oxidant in the cathode in adjacent fuel cell units. The hermeticity appears to be the result of a complete coalescence between the individual fibres squeezed together by the load exerted on the cell stack during the heating step (b) and the use of a temperature during this step which often is at least equal to the softening point of the glass sealant (above 800° C.). A closed pore structure or a dense glass is thereby obtained. The relatively high softening temperature of the sealant (above about 800° C.) enables that the sealant maintains a high viscosity, such as $10^9$-$10^{11}$ Pa-s at the operating temperatures of the fuel cell stack, for instance at 750-800° C.

EXAMPLE 1

An anode supported cell 300 μm thick with internal feeding and exhaust holes has demasked contact layers in the manifold areas in order to minimise leakage through these porous structures. A metal gasket frame covered with equally shaped punched E-glass fibre paper on both sides is placed on both sides of the cell in such a way that air from the manifold holes is allowed to pass over the cathode and fuel gas is allowed to pass over the anode side. Above and below the cell and gasket assemblage is placed an interconnect plate with manifold holes. The E-glass paper contains fibres in an amount of 100 g/m² towards the cell and 50 g/m² towards the interconnect plate corresponding to, respectively, 40 and 20 μm thick dense layer after treatment according to the invention at temperatures of about 880° C. and load pressure of about 6 kg/cm². Building a stack with 5 cells, cross-over leak between the anode and cathode sides has been measured at RT to as low as 0.05 and 0.09% in two stacks after a full thermal cycle. With gas chromatography using steps of $2 \times N_2$ conc. in oxygen on the cathode side and measuring the $N_2$ mole conc. on the anode side during operation with the same gas pressure on the anode and cathode side we obtained a doubling of the $N_2$ mole % in the anode of each step showing that the there is a leakage and that it is diffusion driven, presumably due to the diffusion through the porous structures of the cell (mainly the anode support). Increasing the gas pressure on the cathode side did not have any effect on the cross-over leak on the anode side.

XRD-spectres of the E-glass show the presence of wollastonite, $CaSiO_3$ (diopside, $(Ca,Mg)SiO_3$ also fit the spectrum and its presence is dependent on the MgO-content of the glass) together with anorthite ($CaAl_2Si_2O_8$, which may contain up to 10 moles $NaAlSi_3O_8$) and cristobatite, ($SiO_2$)

Figure 1:
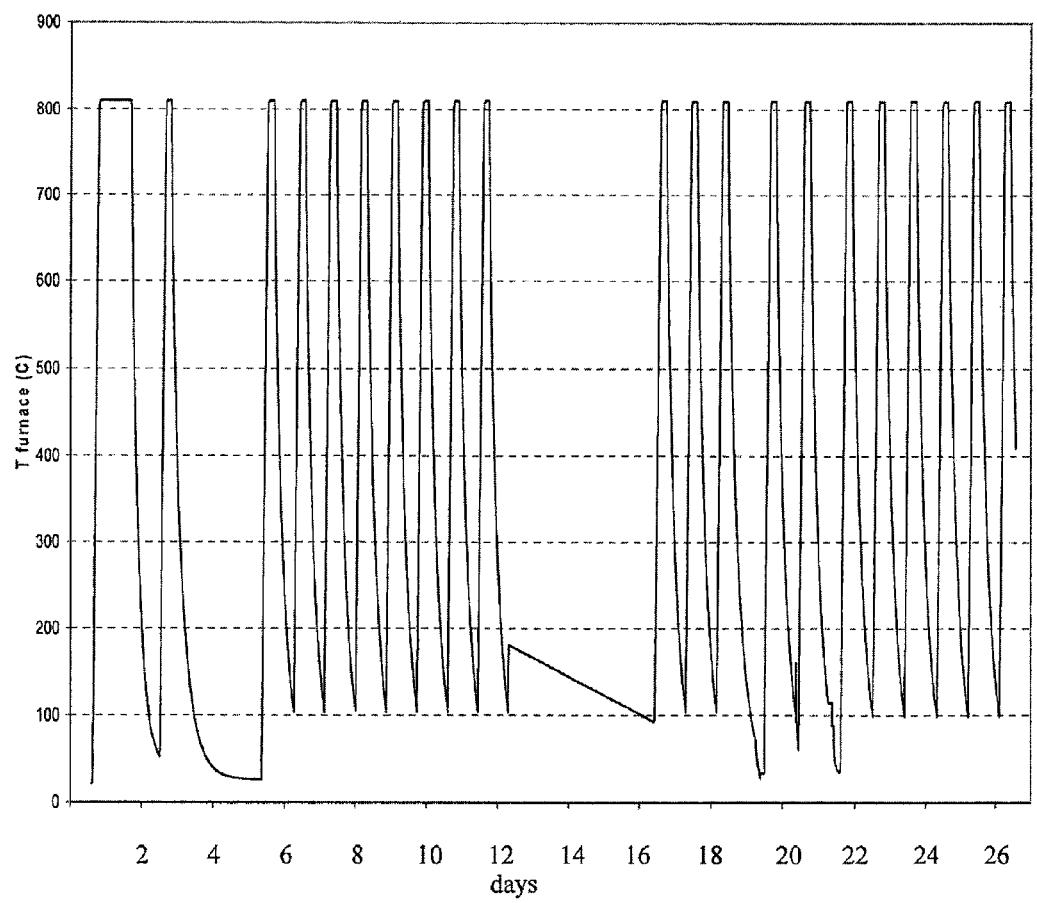
FIG. 1 shows a window of 21 thermal cyclings recorded during operation of a ten-cell stack prepared according to the invention within an overall period of 26 days (units of two days).
Figure 2:
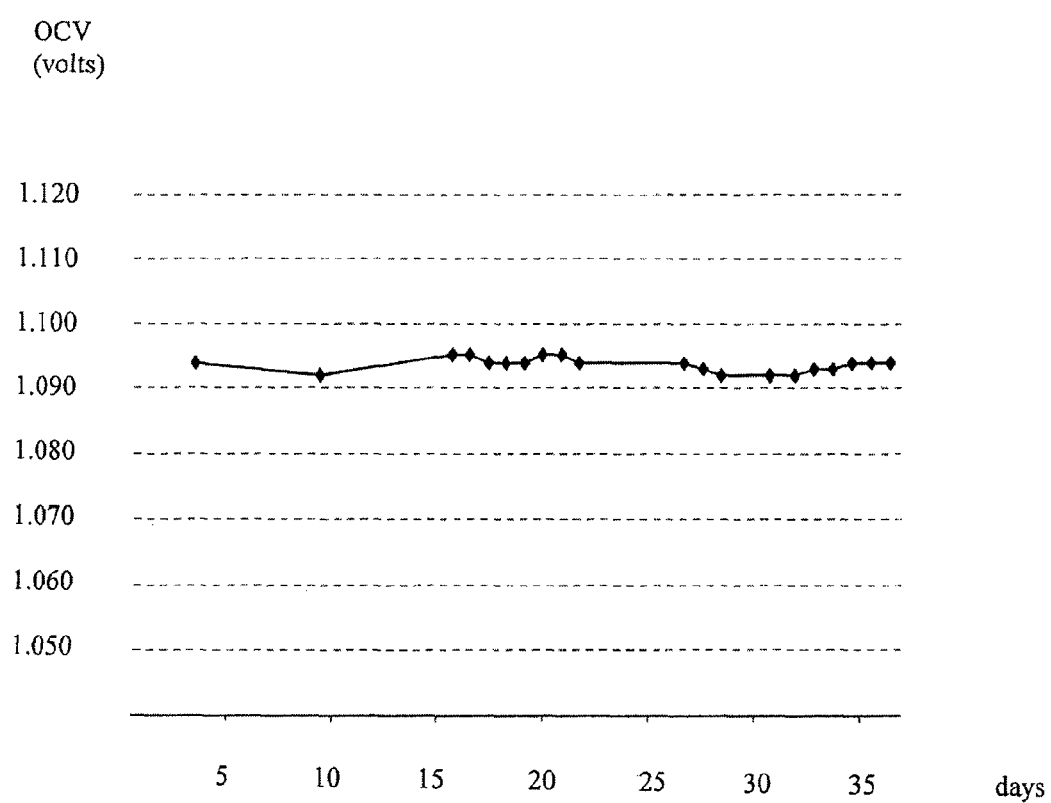
FIG. 2 shows the OCV (open circuit voltage) profile in terms of average values over a period of 40 days (units of 5 days).

Thermal cycling 21 times during operation or removal of a ten-cell stack to other test facilities (FIG. 1) does not have any significant effect on the cross-over leak between the fuel side and air side of the cells as can be seen in the OCV (open circuit voltage) (FIG. 2). The flat OCV profile of FIG. 2 shows that the invention enables to prepare by simple means (use of E-glass fibre paper as glass sealant precursor) a final fuel cell stack in which the components of the stack including the sealant work well together without creation of leakages during normal operation and thermal cycling. In addition, no deteriorating reactions occur between the oxide scale and the E-glass.

Similar flat OCV profiles are obtained in the subsequent examples:

EXAMPLE 2

As Example 1, but the E-glass sealant is infiltrated (by dip coating or spraying) or with a slurry containing 20-50 volt 1-5 μm sized MgO grains, 3' PVA and 67 volt ethanol.

EXAMPLE 3

As Example 2: where the slurry contain 20-50 vol % of 1-3 μm AISI 316L powder.

EXAMPLE 4

As example 2: where the slurry contains 20-50 vol % of leucite.

EXAMPLE 5

E-glass is produced from dry mixing of the oxides in a ball mill to give the composition below, in a ball mill and melting the mixture in a Pt crucible at 1500° C. for two hours. The crucible is then quenched in water or liquid $N_2$ followed by crushing and grounding the sample to a grain size of <10 μm. A paste is then prepared which suitable for use in a dispenser or as a paste for screen printing.

|  | Wt % |
| --- | --- |
| SiO2 | 55.11 |
| CaO | 15.85 |
| MgO | 4.20 |
| Al2O3 | 15.34 |
| B2O3 | 8.80 |
| Na2O | 0.39 |
| K2O | 0.31 |
|  | 100.00 |

EXAMPLE 6

Making the E-glass with the composition below from a sol-gel route: a 92.4 g 30 wt % silica sol (Ludox) is mixed with 9.29 g $B_2CaO_4$+6.68 g $Ca(NO_3)_2$*$4H_2O$+25.75 g $Al(NO_3)_3$*$9H_2O$+5.73 g $Mg(NO_3)_2$*$6H_2O$+0.53 g $Na_2CO_3$. The mixture forms a gel which by calcination to 730° C. forms a glass with tiny crystals of wollastonite and cristobalite according to XRD. The glass is easily crushed and ground to specific size. The gel is used as a paint or a paste for a dispenser or screen printing.

|  | Wt % |
| --- | --- |
| SiO2 | 55.50 |
| CaO | 19.80 |
| MgO | 1.80 |
| Al2O3 | 14.00 |
| B2O3 | 8.00 |
| Na2O | 0.90 |
| K2O | 0.00 |
|  | 100.00 |

What is claimed is:

1. Solid oxide fuel cell stack obtainable by a process comprising the steps of:
    (a) forming a first fuel cell stack assembly by alternating at least one interconnector plate with at least one fuel cell unit, in which each fuel cell unit comprises an anode, a cathode and an electrolyte arranged between the anode and cathode, and providing a glass sealant in between the interconnector plate and each fuel cell unit, in which the glass sealant has the composition:
    50-70 wt % $SiO_2$, 0-20 wt % $Al_2O_3$, 10-50 wt % CaO, 0-10 wt % MgO, 0-2 wt % ($Na_2O+K_2O$), 5-10 wt % $B_2O_3$, and 0-5 wt % of functional elements selected from $TiO_2$, $ZrO_2$, F, $P_2O_5$, $MoO_3$, $Fe_2O_3$, $MnO_2$, La—Sr—Mn—O perovskite (LSM) and combinations thereof;
    (b) converting said first fuel cell stack assembly into a second assembly having a glass sealant of thickness 5-100 μm by heating said first assembly to a temperature of 500° C. or higher and subjecting the cell stack to a load pressure of 2 to 20 kg/cm$^2$;
    (c) converting said second assembly into a final fuel cell stack assembly by cooling the second assembly of step (b) to a temperature below that of step (b).

2. Solid oxide fuel cell stack obtainable by a process comprising the steps of:
    (a) forming a first fuel cell stack assembly by alternating at least one interconnector plate with at least one fuel cell unit, in which each fuel cell unit comprises an anode, a cathode and an electrolyte arranged between the anode and cathode, and providing a glass sealant in between the interconnector plate and each fuel cell unit in which the gas sealant has the composition:
    50-70 wt % $SiO_2$, 0-20 wt % $Al_2O_3$, 10-50 wt % CaO, 0-10 wt % MgO, 0-2 wt % ($Na_2O+K_2O$), 5-10 wt % $B_2O_3$, and 0-5 wt % of functional elements selected from $TiO_2$, $ZrO_2$, F, $P_2O_5$, $MoO_3$, $Fe_2O_3$, $MnO_2$, La—Sr—Mn—O perovskite (LSM) and combinations thereof;
    (b) converting said first fuel cell stack assembly into a second assembly having a glass sealant of thickness 5-100 μm by heating said first assembly to a temperature of 800° C. or higher and subjecting the cell stack to a load pressure of 2 to 10 kg/cm$^2$,
    (c) converting said second assembly into a final fuel cell stack assembly by cooling the second assembly of step (b) to a temperature below that of step (b).

3. Solid oxide fuel cell stack according to claim 1, wherein the content of $SiO_2$, $Al_2O_3$, CaO and MgO represents 85-95 wt % of the glass sealant composition, the content of $Na_2O+K_2O$ and $B_2O_3$ represents 5-12 wt % of the glass sealant composition and functional elements selected from $TiO_2$, F, $ZrO_2$, $P_2O_5$, $MoO_3$, $Fe_2O_3$, $MnO_2$ and La—Sr—Mn—O perovskite (LSM) and combinations thereof represent 0-5 wt %.

4. Solid oxide fuel cell stack according to claim 1, wherein the glass sealant is a glass with composition: 52-56 wt % $SiO_2$, 12-16 wt % $Al_2O_3$, 16-25 wt % CaO, 0-6 wt % MgO, 0-2 wt % $Na_2O+K_2O$, 5-10 wt % $B_2O_3$, 0-1.5 wt % $TiO_2$, 0-1 wt % F.

5. Solid oxide fuel cell stack according to claim 1, wherein the glass sealant in step (a) is provided as a sheet of glass fibres.

6. Solid oxide fuel cell stack according to claim 1, wherein the sheet of glass fibers contains fibers in an amount of 70-100 g/m$^2$ towards the cell and 30-60 g/m$^2$ towards the interconnect plate.

7. Solid oxide fuel cell stack according to claim 1, wherein the glass sealant in step (a) is further loaded with filler material in the form of MgO, steel-powder, quartz, leucite and combinations thereof.

8. Solid oxide fuel cell stack, wherein the glass sealant is a paste formed by mixing a glass powder having the composition of claim 1 with a binder and an organic solvent.

9. Solid oxide fuel cell stack according to claim 8, wherein the glass powder is further mixed with a filler material in the form of MgO, steel-powder, quartz, leucite and combinations thereof.

10. A method of power generation comprising the step of utilizing E-glass with composition 52-56 wt % $SiO_2$, 12-16 wt % $Al_2O_3$, 16-25 wt % CaO, 0-6 wt % MgO, 0-2 wt % $Na_2O+K_2O$, 5-10 wt % $B_2O_3$, 0-1.5 wt % $TiO_2$, 0-1 wt % F as glass sealant in solid oxide fuel cell stacks formed by alternating at least one interconnect plate and at least one cell with the glass sealant in between the interconnect plate and the cell, wherein the glass is provided as a sheet of glass fibers and wherein the sheet of glass fibers contains fibers in an amount of 70-100 g/m$^2$ towards the cell and 30-60 g/m$^2$ towards the interconnect plate.

* * * * *